US010433368B2

(12) United States Patent
Chien et al.

(10) Patent No.: US 10,433,368 B2
(45) Date of Patent: Oct. 1, 2019

(54) METHODS FOR RE-SYNCHRONIZING A COMMUNICATION MODE WITH A PEER DEVICE AND COMMUNICATIONS APPARATUS UTILIZING THE SAME

(71) Applicant: MediaTek Inc., Hsin-Chu (TW)

(72) Inventors: Shih-Hsin Chien, New Taipei (TW); Chi-Chen Lee, Taipei (TW); Wen-Jiunn Liu, Hsinchu (TW); Ching-Yueh Kao, Taipei (TW); Shih-Chieh Liao, Kaohsiung (TW); Yu-Tien Yeh, New Taipei (TW); Sian-Jheng Wong, Yizhu Township, Chiayi County (TW); Tien-Yi Huang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 526 days.

(21) Appl. No.: 14/944,453

(22) Filed: Nov. 18, 2015

(65) Prior Publication Data
US 2016/0142992 A1 May 19, 2016

Related U.S. Application Data

(60) Provisional application No. 62/081,692, filed on Nov. 19, 2014.

(51) Int. Cl.
*H04J 3/06* (2006.01)
*H04W 88/06* (2009.01)
(Continued)

(52) U.S. Cl.
CPC ........... *H04W 88/06* (2013.01); *H04L 5/0007* (2013.01); *H04L 5/0098* (2013.01); *H04W 24/02* (2013.01);
(Continued)

(58) Field of Classification Search
CPC ..... H04W 74/08; H04W 76/04; H04W 56/00; H04W 68/00; H04W 76/046; H04W 56/001; H04W 74/0833
See application file for complete search history.

(56) References Cited

U.S. PATENT DOCUMENTS 8,938,155 B2 * 1/2015 Ishimaru ................ H04N 5/232
386/248
9,319,952 B2 4/2016 Zhao et al.
(Continued)

FOREIGN PATENT DOCUMENTS

CN 101621613 A 1/2010
CN 102761952 A 10/2012
(Continued)

*Primary Examiner* — Abdelillah Elmejjarmi
(74) *Attorney, Agent, or Firm* — McClure, Qualey & Rodack, LLP

(57) ABSTRACT

A communications apparatus includes a radio transceiver and a processor. The radio transceiver is configured for transmitting or receiving wireless radio frequency signals to or from a peer device. The processor determines whether re-synchronization in a communication mode with the peer device is required according to a determination rule. When the re-synchronization is required, the processor transmits a message to the peer device via the radio transceiver to trigger a re-synchronization procedure. The processor determines whether the re-synchronization is required in a connected mode.

16 Claims, 17 Drawing Sheets

(51) Int. Cl.
  *H04W 56/00*   (2009.01)
  *H04W 76/27*   (2018.01)
  *H04W 76/15*   (2018.01)
  *H04L 5/00*    (2006.01)
  *H04W 24/02*   (2009.01)
  *H04W 74/08*   (2009.01)

(52) U.S. Cl.
  CPC ..... *H04W 56/001* (2013.01); *H04W 74/0833* (2013.01); *H04W 76/15* (2018.02); *H04W 76/27* (2018.02)

(56) References Cited

U.S. PATENT DOCUMENTS

| | | | |
|---|---|---|---|
| 9,503,981 B2 | 11/2016 | Baglin et al. | |
| 9,998,992 B2 | 6/2018 | Chen | |
| 2010/0120432 A1* | 5/2010 | Watfa | H04W 76/18 455/436 |
| 2010/0240359 A1* | 9/2010 | Wu | H04W 24/00 455/424 |
| 2011/0222515 A1* | 9/2011 | Wang | H04W 84/20 370/338 |
| 2013/0331057 A1 | 12/2013 | Kodali et al. | |
| 2014/0004849 A1 | 1/2014 | Su et al. | |
| 2014/0112286 A1* | 4/2014 | Ahn | H04W 74/002 370/329 |
| 2014/0146759 A1* | 5/2014 | Cho | H04W 76/27 370/329 |
| 2014/0334389 A1* | 11/2014 | Abdel-Samad | H04W 74/004 370/329 |
| 2016/0150496 A1* | 5/2016 | Kim | H04W 28/0226 455/435.1 |
| 2016/0262058 A1* | 9/2016 | Jeong | H04W 4/025 |

FOREIGN PATENT DOCUMENTS

| | | |
|---|---|---|
| CN | 104205994 A | 12/2014 |
| CN | 104221432 A | 12/2014 |

\* cited by examiner

METHODS FOR RE-SYNCHRONIZING A COMMUNICATION MODE WITH A PEER DEVICE AND COMMUNICATIONS APPARATUS UTILIZING THE SAME

CROSS REFERENCE TO RELATED APPLICATIONS

This application claims the benefit of U.S. Provisional Application No. 62/081,692 filed on 2014 Nov. 19 and entitled "eGemini (Evolved Gemini) inventions", the entire contents of which are hereby incorporated by reference.

BACKGROUND OF THE INVENTION

Field of the Invention

The invention relates to methods for a communications apparatus to re-synchronize a communication mode with a peer device communicating with the communications apparatus.

Description of the Related Art

The term "wireless", normally refers to an electrical or electronic operation, which is accomplished without the use of a "hard wired" connection. "Wireless communications", is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and well-defined cellular communications technologies. For example, the Global System for Mobile communications (GSM) is a well-defined and commonly used communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Wireless Fidelity (Wi-Fi) is a technology defined by the 802.11 engineering standard and can be used for home networks, mobile phones, video games, to provide a high-frequency wireless local area network.

With the advanced development of wireless communications technologies, the power-consumption issue and service quality issue become more and more important. In order to provide more efficient communications services, methods for a communications apparatus re-synchronizing a communication mode with a peer device communicating with the communications apparatus are provided.

BRIEF SUMMARY OF THE INVENTION

Communications apparatus and methods for re-synchronizing a communication mode with a peer device are provided. An exemplary embodiment of a communications apparatus comprises a radio transceiver and a processor. The radio transceiver is configured for transmitting or receiving wireless radio frequency signals to or from a peer device. The processor determines whether re-synchronization in a communication mode with the peer device is required according to a determination rule. When the re-synchronization is required, the processor transmits a message to the peer device via the radio transceiver to trigger a re-synchronization procedure. The processor determines whether the re-synchronization is required in a connected mode An exemplary embodiment of a method for a communications apparatus to re-synchronize a communication mode with a peer device communicating with the communications apparatus comprises: determining whether re-synchronization in a communication mode with the peer device is required according to a determination rule; and when the re-synchronization is required, transmitting a message to the peer device to trigger a re-synchronization procedure. The determination is made in a connected mode.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
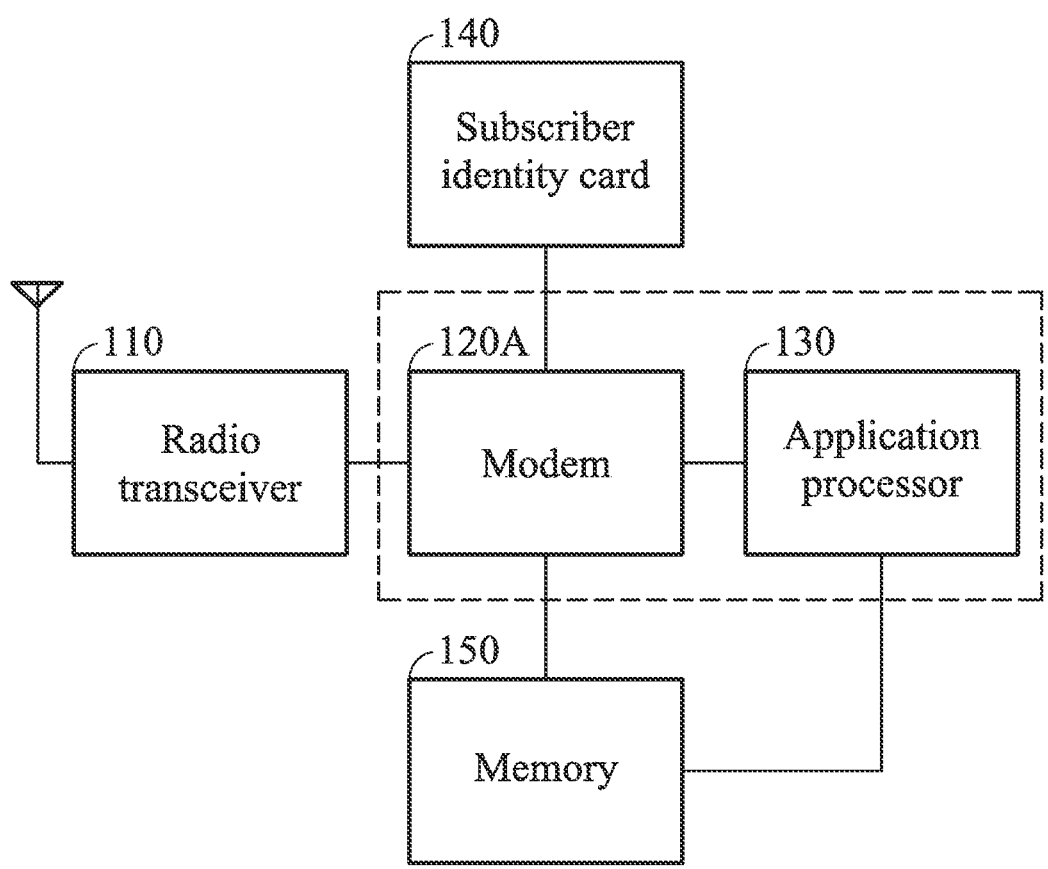
FIG. 1A shows an exemplary block diagram of a communications apparatus according to an embodiment of the invention.

FIG. 1A shows an exemplary block diagram of a communications apparatus according to an embodiment of the invention. The communications apparatus 100A may be a portable electronic device, such as a mobile station (MS, which may be interchangeably referred to as user equipment (UE)). The communications apparatus 100A may comprise at least an antenna module comprising at least one antenna, a radio transceiver 110, a modem 120A, an application processor 130, a subscriber identity card 140, and a memory 150. The radio transceiver 110 may receive wireless radio frequency signals via the antenna module, transmit wireless radio frequency signals via the antenna module and perform RF signal processing. For example, the radio transceiver 110 may convert the received signals to intermediate frequency (IF) or baseband signals to be processed, or receive the IF or baseband signals from the modem 120A and convert the received signals to wireless radio frequency signals to be transmitted to a peer device. According to an embodiment of the invention, the peer device may be a cell, an evolved node B, a base station, etc., at the network side and communicating with the communications apparatus 100A via the wireless radio frequency signals.

The radio transceiver 110 may comprise a plurality of hardware devices to perform radio frequency conversion and RF signal processing. For example, the radio transceiver 110 may comprise a power amplifier, a filter and/or a mixer. According to an embodiment of the invention, the radio frequency may be, for example, 900 MHz or 1800 MHz for a global system for mobile communication (GSM), or 1900 MHz for a Universal Mobile Telecommunications System (UMTS), or the frequency of any specific frequency band for a Long-Term Evolution (LTE) system, etc.

The modem 120A may be a cellular communications modem configured for handling cellular system communications protocol operations and processing the IF or baseband signals received from or to be transmitted to the radio transceiver 110. The application processor 130 is configured for running the operating system of the communications apparatus 100A and running application programs installed in the communications apparatus 100A. In the embodiments of the invention, the modem 120A and the application processor 130 may be designed as discrete chips with some buses or hardware interfaces coupled therebetween, or they may be integrated into a combo chip (i.e., a system on chip (SoC)), and the invention should not be limited thereto. The subscriber identity card 140 may be a SIM, USIM, R-UIM or CSIM card, or the like and may typically contain user account information, an international mobile subscriber identity (IMSI) and a set of SIM application toolkit (SAT) commands and provides storage space for phone book contacts. The memory 150 may be coupled to the modem 120A and application processor 130 and may store system data or user data.

FIG. 1A shows a case of single-card single-standby application. With advancements in communications techniques, the communications apparatuses are now capable of supporting multi-card multi-standby application and handling multi-RAT's (radio access technology's) operations, such as at least two of GSM/GPRS/EDGE (Global System for Mobile Communications/General Packet Radio Service/Enhanced Data rates for Global Evolution), WCDMA (Wideband Code Division Multiple Access), cdma2000, WiMAX (Worldwide Interoperability for Microwave Access), TD-SCDMA (Time Division Synchronous Code Division Multiple Access), LTE (Long Term Evolution), and TD-LTE (Time Division Long Term Evolution) RATs, or similar via one communications apparatus.

Figure 1B:
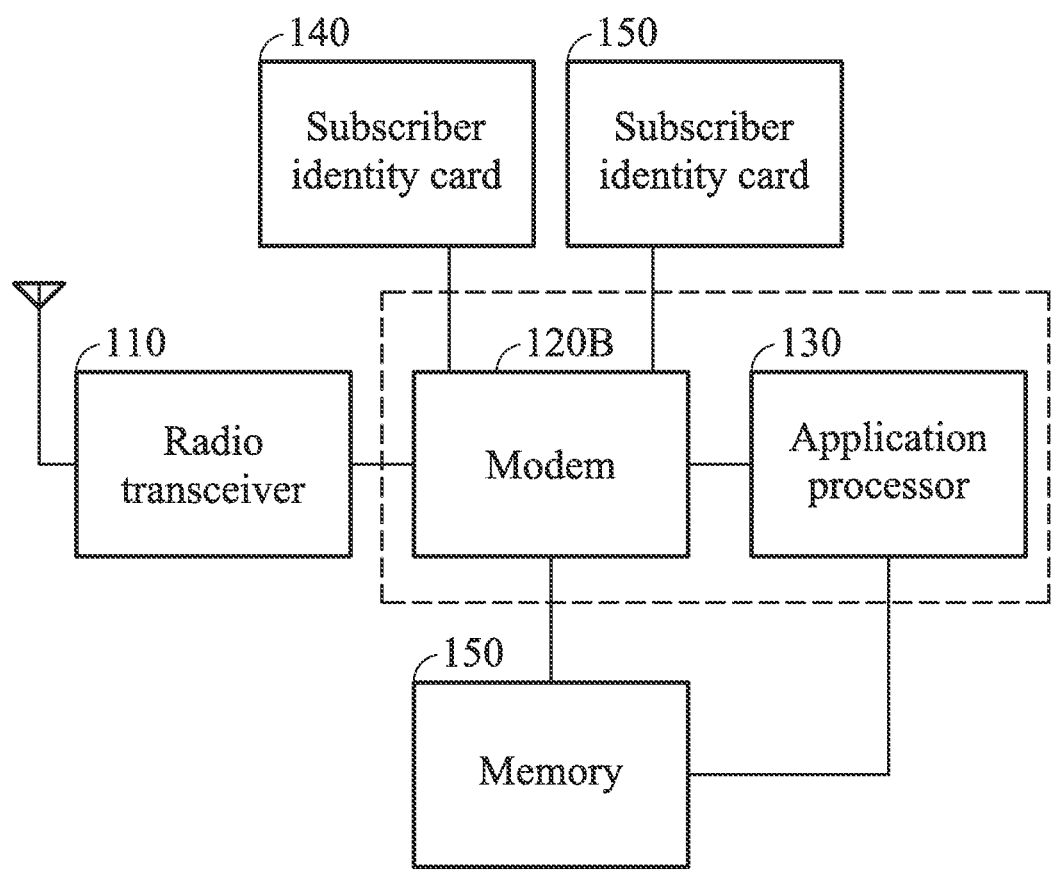
FIG. 1B shows an exemplary block diagram of a communications apparatus according to another embodiment of the invention.

FIG. 1B shows an exemplary block diagram of a communications apparatus according to another embodiment of the invention. Most of the elements shown in FIG. 1B are similar to FIG. 1A, and thus the descriptions are omitted here for brevity. In this embodiment, the communications apparatus 100B may comprise multiple subscriber identity cards 140 and 150 coupled to the modem 120B, thereby the modem 120B may at least support two RATs communications, wherein the two RATs may be different RATs or the same RAT, and the invention should not be limited to either case.

According to an embodiment of the invention, the modem 120B, the radio transceiver 110 and/or the antenna module may be shared by subscriber identity cards 140 and 150 to support at least two RATs communications. Therefore, in this embodiment, the communications apparatus 100B may be regarded as comprising at least two communications units, one may at least comprise the subscriber identity card 140, (all or part of) the modem 120B, the radio transceiver 110 and the antenna module, and another one may at least comprise the subscriber identity card 150, (all or part of) the modem 120B, the radio transceiver 110 and the antenna module.

According to an embodiment of the invention, the modem 120B may have the capability of handling operations of multiple cellular system communications protocols and processing the IF or baseband signals for the corresponding communications units. Each communications unit may operate independently at the same time in compliance with a corresponding communications protocol, thereby the communications apparatus 100B can support a multi-card multi-standby application.

Note that, in order to clarify the concept of the invention, FIG. 1A and FIG. 1B present simplified block diagrams in which only the elements relevant to the invention are shown. For example, in some embodiments of the invention, the communications apparatus may further comprise some peripheral devices not shown in FIG. 1A and FIG. 1B. In another example, in some embodiments of the invention, the communications apparatus may further comprise a central controller coupled to the modem 120A/120B and the application processor 130. Therefore, the invention should not be limited to what is shown in FIG. 1A and FIG. 1B.

Note further that subscriber identity cards 140 and 150 may be dedicated hardware cards as described above, or in some embodiments of the invention, may be individual identifiers, numbers, addresses, or the like which are burned in the internal memory device of the corresponding modem and are capable of identifying the individual communications entity that the corresponding communications unit operates. Therefore, the invention should not be limited to what is shown in the figures.

Note further that although communications apparatuses 100B shown in FIG. 1B support two RAT wireless communications services, the invention should not be limited thereto. Those who are skilled in this technology can still make various alterations and modifications based on the descriptions given above to derive the communications apparatuses capable of supporting more than two RAT wireless communications without departing from the scope and spirit of this invention.

Note further that, although in FIG. 1B, the radio transceiver 110 and the antenna module are shared by multiple communications units, the invention should not be limited thereto. Those who are skilled in this technology can still make various alterations and modifications based on the descriptions given above to derive the communications apparatuses comprising multiple radio transceivers and/or multiple antenna modules for supporting multiple RAT wireless communications without departing from the scope and spirit of this invention.

Figure 2:
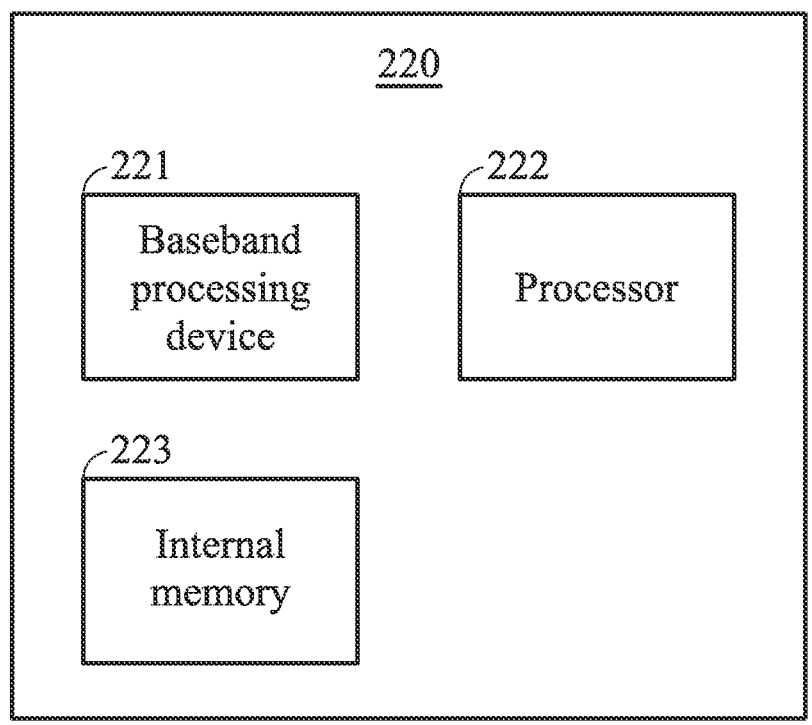
FIG. 2 shows an exemplary block diagram of a modem according to an embodiment of the invention.

FIG. 2 shows an exemplary block diagram of a modem according to an embodiment of the invention. The modem 220 may be the modem 120A or 120B shown in FIG. 1A and FIG. 1B and may comprise at least a baseband processing device 221, a processor 222 and an internal memory 223. The baseband processing device 221 may receive the IF or baseband signals from the radio transceiver 110 and perform IF or baseband signal processing. For example, the baseband processing device 221 may convert the IF or baseband signals to a plurality of digital signals, and process the digital signals, and vice versa. The baseband processing device 221 may comprise a plurality of hardware devices to perform signal processing. The signal processing may comprise analog-to-digital conversion (ADC)/digital-to-analog conversion (DAC), gain adjustment, modulation/demodulation, encoding/decoding, and so on.

The processor 222 may control the operations of the modem 220. According to an embodiment of the invention, the processor 222 may be arranged to execute the program codes of the corresponding software module of the modem 220. The processor 105 may maintain and execute the individual tasks, threads, and/or protocol stacks for different software modules. In a preferred embodiment, a protocol stack may be implemented so as to respectively handle the radio activities of one RAT. However, it is also possible to implement more than one protocol stack to handle the radio activities of one RAT at the same time, or implement only one protocol stack to handle the radio activities of more than one RAT at the same time, and the invention should not be limited thereto.

The processor 222 may further read data from the plugged in subscriber identity card coupled to the modem, such as the subscriber identity card 140 and/or 150, and write data to the plugged in subscriber identity card. The internal memory 223 may store system data and user data for the modem 220. The processor 222 may also access the internal memory 223.

Note that in order to clarify the concept of the invention, FIG. 2 present simplified block diagrams in which only the elements relevant to the invention are shown. Therefore, the invention should not be limited to what is shown in FIG. 2.

Note further that in some embodiments of the invention, the modem may comprise more than one processor and/or more than one baseband processing device. For example, the modem may comprise multiple processors and/or multiple baseband processing devices for supporting multi-RAT operations. Therefore, the invention should not be limited to what is shown in FIG. 2.

According to an embodiment of the invention, the communications apparatus (e.g. the communications apparatus 100A or 100B) may communicate with a peer device (e.g. a cell, an evolved node B, a base station, etc.) by transmitting and receiving a plurality of wireless radio frequency signals. In an example, for the single-card single-standby application as shown in FIG. 1A, the communications apparatus 100A may communicate with a peer device in compliance with a corresponding communications protocol. To be more specific, the communications apparatus 100A may communicate with a peer device before camping on the peer device. The communications apparatus 100A may also perform a predetermined procedure to camp on the peer device, and keep communicating with the peer device after camping on the peer device. The procedure to camp on a peer device (for example, a cell, a base station, an evolved node B, etc., at the network side) is well-known in the art, and is omitted here for brevity.

In another example, for the multi-card multi-standby application as shown in FIG. 1B, each communications unit comprised in the communications apparatus 100B may communicate with a corresponding peer device in compliance with a corresponding communications protocol. To be more specific, each communications unit comprised in the communications apparatus 100B may communicate with a corresponding peer device before camping on the corresponding peer device. Each communications unit comprised in the communications apparatus 100B may also perform a predetermined procedure to camp on the corresponding peer device, and keep communicating with the corresponding peer device after camping on the corresponding peer device.

Figure 3:
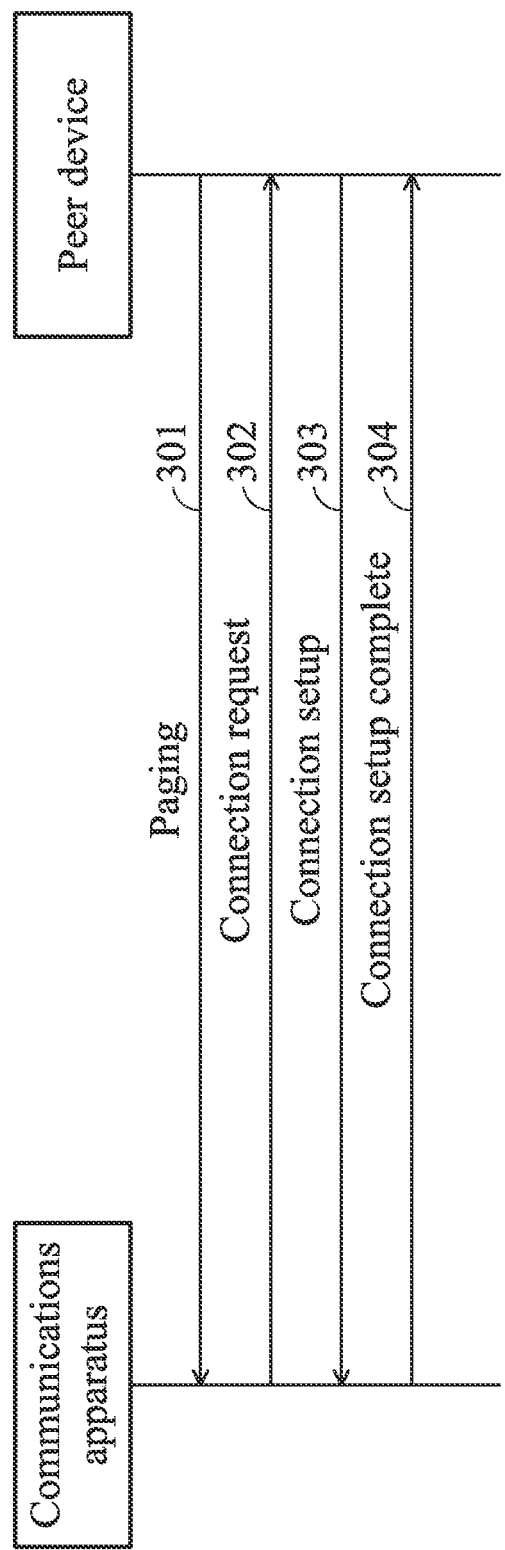
FIG. 3 shows an exemplary message flow according to an embodiment of the invention.

After camping on a corresponding peer device, the communications apparatus (or, the corresponding communications unit, hereinafter using the term communications apparatus for brevity) may operate in an idle mode and listen to the paging from the network. FIG. 3 shows an exemplary message flow according to an embodiment of the invention. When the communications apparatus receives a paging message 301 from the peer device in the network, the communications apparatus may transmit a connection request message 302 (for example, a radio resource control (RRC) connection request) to the peer device to set up an RRC connection. The peer device in the network may transmit a connection setup message 303 to the communications apparatus. The communications apparatus may setup the RRC connection and then respond a connection setup complete message 304 to the peer device. After transmitting the connection setup complete message 304, the communications apparatus may leave the idle mode and enter the connected mode.

After entering the connected mode, the communications apparatus may operate in the connected mode and perform some procedures as defined by the corresponding standards. When receiving a connection release message from the peer device, the communications apparatus may release the RRC connection, leave the connected mode and return the idle mode.

Generally, a communication mode operated by the communications apparatus and a communication mode of the communications apparatus maintained (or, deemed) by the corresponding peer device should be synchronized. According to an embodiment of the invention, the communication mode may comprise at least an idle mode, a connected mode, etc.

However, in some scenarios, the communication mode currently operated by the communications apparatus and communication mode of the communications apparatus maintained or deemed by the corresponding peer device may be possibly asynchronous. Here, the term 'possibly asynchronous' means that there is a high possibility of it being asynchronous by analyzing the network behaviors, since it is hard for the communications apparatus to know what is actually maintained by the peer device.

One exemplary scenario for the communication modes to be possibly asynchronous is that the communications apparatus stays in the connected mode but there is no uplink or downlink data transmission to or from the peer device for a long period of time. Another exemplary scenario for the communication modes to be possibly asynchronous is that, the communications apparatus receives a paging message in the connected mode (hereinafter called a "connected mode paging").

Figure 4A:
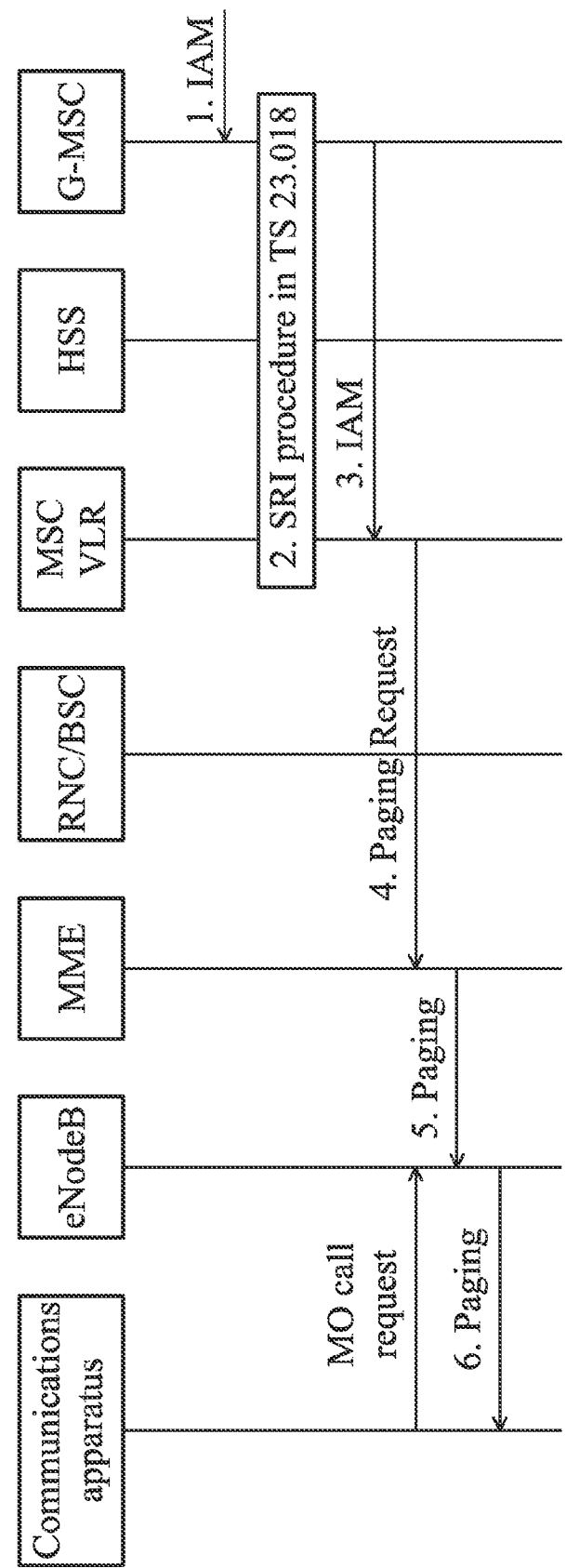
FIG. 4A is an exemplary message flow showing the exemplary scenario when receiving a connected mode paging.

FIG. 4A is an exemplary message flow showing the exemplary scenario when receiving a connected mode paging. In FIG. 4A, a racing condition is met when the communications apparatus transmits a mobile originated (MO) call request to the network while receiving a mobile terminated (MT) circuit-switched (CS) paging message from the network at the same time. In this scenario, a conflict between the MO call request and the CS paging causes the communications apparatus to receive a connected mode paging. Here, the MO call request may be an extended service request (ESR), a service request or a MO signaling.

Figure 4B:
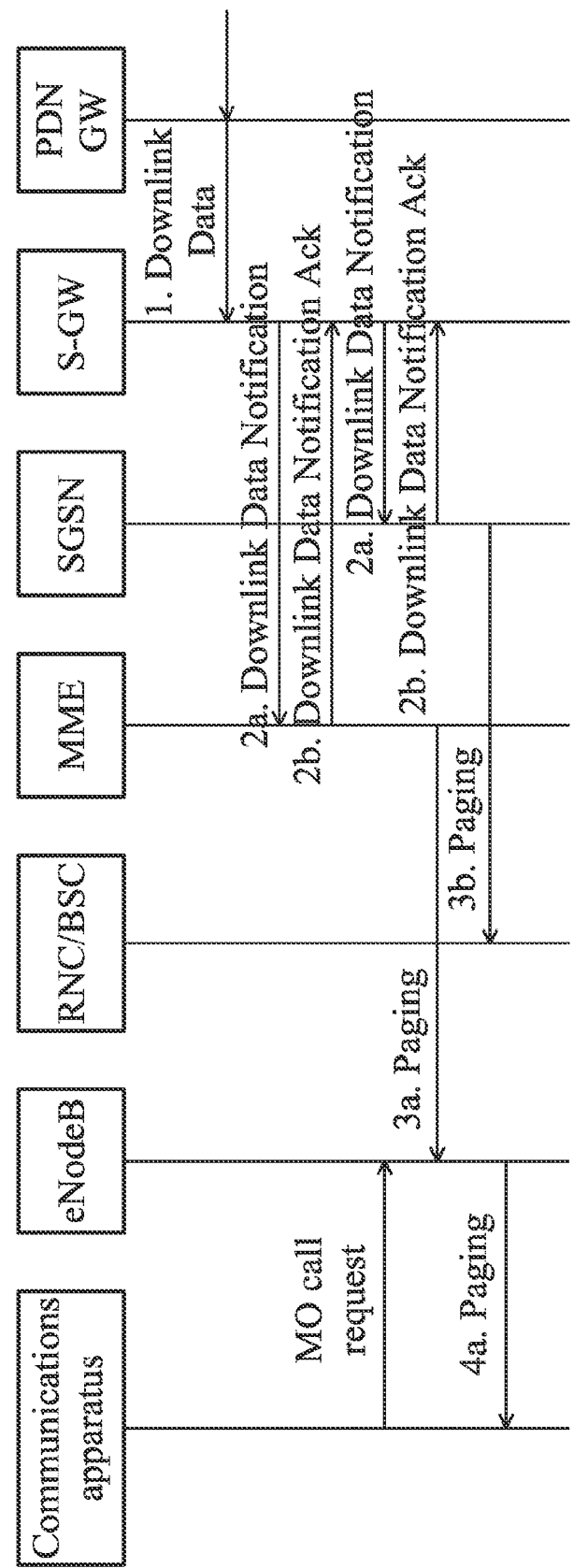
FIG. 4B is another exemplary message flow showing the exemplary scenario when receiving a connected mode paging.

FIG. 4B is another exemplary message flow showing the exemplary scenario when receiving a connected mode paging. In FIG. 4B, a racing condition is met when the communications apparatus transmits a MO call request to the network while receiving a MT packet-switched (PS) paging message from the network at the same time. In this scenario, a conflict between the MO call request and the PS paging causes the communications apparatus to receive a connected mode paging. Here, the MO call request may be an extended service request (ESR), a service request or a MO signaling.

Figure 4C:
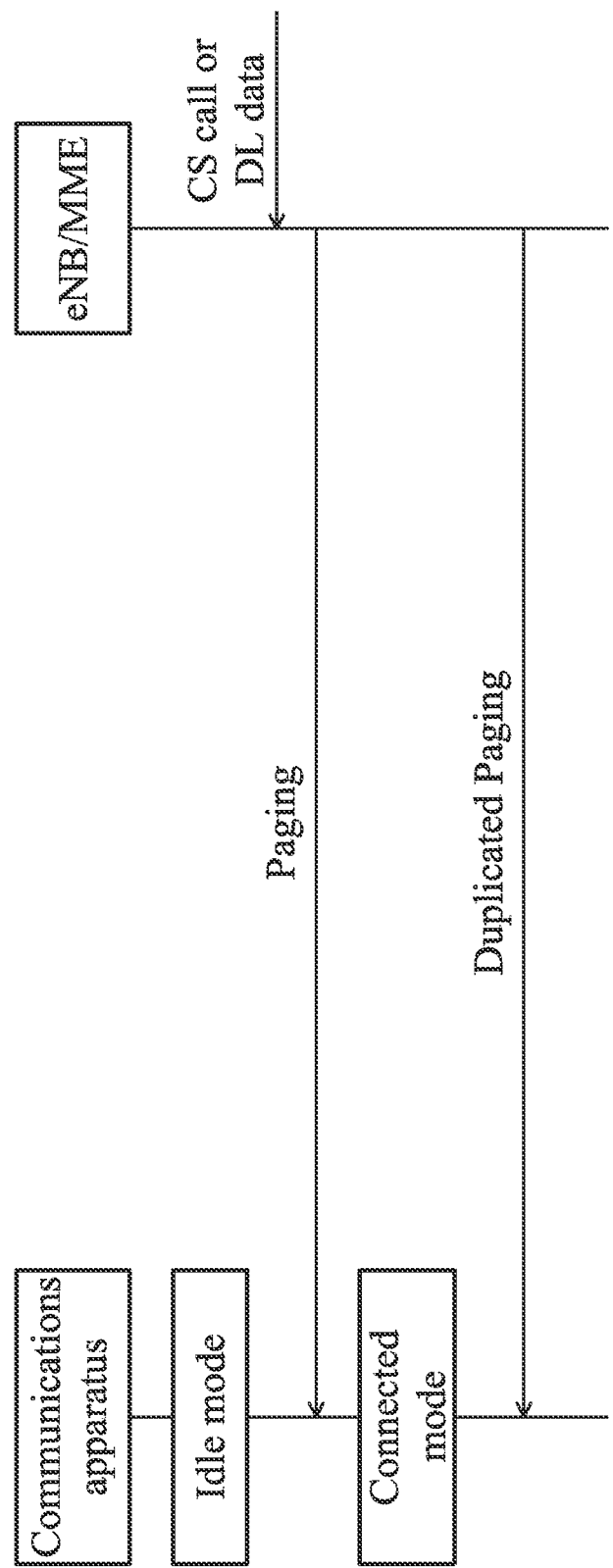
FIG. 4C is yet another exemplary message flow showing the exemplary scenario when receiving a connected mode paging.

FIG. 4C is yet another exemplary message flow showing the exemplary scenario when receiving a connected mode paging. In FIG. 4C, the communications apparatus receives a CS call paging or a PS paging from the network in the idle mode. After establishing an RRC connection, the communications apparatus enters the connected mode. However, the eNB in the network may resend the paging message to the communications apparatus, and such a duplicated paging becomes a connected mode paging.

In yet another exemplary scenario, the communications apparatus may be unable to receive data or signals transmitted by the peer device in the network, or unable to transmit uplink data or signals to the peer device for some reason, such as in a poor service environment. In such circumstances, the peer device may consider the communications apparatus to be out of service and may locally release the context for the communications apparatus and switch the state (that is, the communications mode) of the communications apparatus to RRC idle (that is, the idle mode). However, the communications apparatus may not be aware of that and may still operate in the connected mode. In this manner, the communications apparatus may operate in the connected mode without any uplink or downlink data transmission for a long period of time.

The 3GPP standards only specify how to handle a paging in the idle mode, and fail to specify how to handle a paging in the connected mode. If the communications apparatus just discards the paging received in the connected mode, the peer device may consider the communications apparatus is out of service and may not send any CS or PS paging to the communications apparatus, causing the communications apparatus to become unable to receive any CS or PS paging. In addition, staying in the connected state without any uplink or downlink data transmission is also very power-consuming for a communications apparatus. To solve these problems, methods for a communications apparatus to re-synchronize a communication mode with a peer device are highly required.

Figure 5:
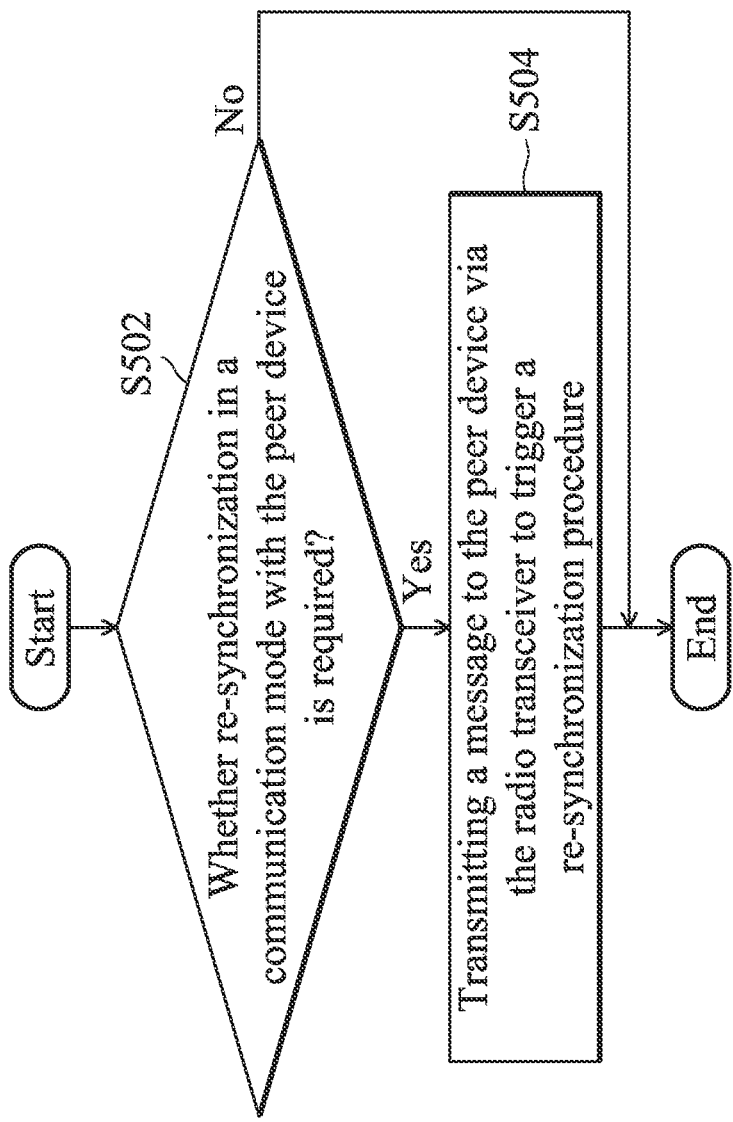
FIG. 5 shows a flow chart of a method for a communications apparatus to re-synchronize a communication mode with a peer device communicating with the communications apparatus according to an embodiment of the invention.

FIG. 5 shows a flow chart of a method for a communications apparatus to re-synchronize a communication mode with a peer device communicating with the communications apparatus according to an embodiment of the invention. The processor (e.g. the processor 222) may determine whether re-synchronization in a communication mode with the peer device is required according to a determination rule (Step S502). When the re-synchronization is required, the processor may transmit a message to the peer device via the radio transceiver to trigger a re-synchronization procedure (Step S504). Note that in the embodiments of the invention, the processor may determine whether the re-synchronization is required and trigger the re-synchronization procedure in a connected mode.

According to an embodiment of the invention, the determination rule may be whether a paging message is received from the peer device in the connected mode and whether there is no uplink or downlink data transmission to or from the peer device for a predetermined period in the connected mode. When a paging message is received from the peer device in the connected mode or when there is no uplink or downlink data transmission to or from the peer device for a predetermined period in the connected mode, the processor may transmit a message to the peer device via the radio transceiver to trigger a re-synchronization procedure.

According to an embodiment of the invention, when the paging message received from the peer device in the connected mode is a circuit-switched (CS) paging, the processor transmits an extended service request (ESR) message to the peer device via the radio transceiver. The processor may check the cn-Domain field in the paging record to determine whether the paging message is a circuit-switched (CS) paging or a packet-switched (PS) paging.

After transmitting the ESR message to the peer device in the network, the behavior of the communications apparatus follows the procedures as defined by the 3GPP standards. For example, when the communications apparatus operates in compliance with the LTE standards or the communications apparatus comprises an LTE communications unit operating in compliance with the LTE standards and when the peer device sends an ACK message in response to the ESR message, the communications apparatus may then receive a channel release message with redirection information. The communications apparatus or the corresponding LTE communications unit may perform the circuit switch fallback (CSFB) procedure to redirect to the 2G or 3G network to establish a CS call. When the peer device does not reply to the ESR message with an ACK message or the communications apparatus cannot send the ESR message successfully, the communications apparatus or the corresponding LTE communications unit may further trigger a radio link failure procedure and/or a reestablishment procedure as defined by the corresponding 3GPP standards. If the radio link failure procedure fails and/or the reestablishment request is rejected by the peer device, the communications apparatus or the corresponding LTE communications unit may further perform PLMN search to camp on a 2G or 3G cell and establish a CS call in the 2G or 3G network.

On the other hand, when the paging message received from the peer device in the connected mode is a packet-switched (PS) paging, the processor may transmit a scheduling request message or a random access request message to the peer device via the radio transceiver. After transmitting the SR or RA request message to the peer device in the network, the behavior of the communications apparatus follows the procedures as defined by the 3GPP standards. For example, when the SR or RA succeeds, it means that the peer device is aware that the communications apparatus is still in the network and the communications apparatus can keep operating in the connected mode. When the SR or RA procedure fails, the communications apparatus may further trigger a reestablishment procedure. If the reestablishment procedure still fails, the communications apparatus may release the RRC connection and transmit a tracking area update request to the peer device via the radio transceiver to trigger a TAU procedure as defined by the corresponding 3GPP standards.

According to another embodiment of the invention, when the processor determines that there is no uplink or downlink data transmission to or from the peer device for a predetermined period in the connected mode, the processor transmits a random access request message to the peer device via the radio transceiver to trigger a C-RNTI based random access procedure. Note that in the embodiment of the invention, the uplink or downlink data transmission comprise both the data plan (data transmission over data radio bearer) and control plan (data transmission over signaling radio bearer).

After transmitting the RA request message to the peer device in the network, the behavior of the communications apparatus follows the procedures as defined by the 3GPP standards. According to an embodiment of the invention, when the random access procedure fails, the processor may determine to leave the connected mode and returns to an idle mode. On the other hands, when the random access procedure succeeds, the processor may determine to keep operating in the connected mode. However, when the random access procedure has been triggered and succeeded a predetermined number of times, but there is still no uplink or downlink data transmission to or from the peer device, the processor may determine to perform local release to release an RRC connection and transmits a tracking area update request to the peer device via the radio transceiver to trigger a TAU procedure.

According to an embodiment of the invention, the processor may set a timer T2 for detecting whether there is any uplink or downlink data transmission to or from the peer device. When the timer T2 has expired and there is no uplink or downlink data transmission to or from the peer device within this period, the processor transmits a random access request message to the peer device via the radio transceiver to trigger a random access procedure as discussed above. The length of the timer T2 may be determined according to previous experience. For example, the processor may record the length of the period without uplink or downlink data transmission before receiving a connection release message from the peer device. The PLMN ID, TAC and/or CELL ID corresponding to the peer device may be recorded accordingly. The length of the recorded period may be related to the length of the inactive timer maintained by the peer device for the communications apparatus. In this manner, the length of the timer T2 may be determined according to the length of the recorded period.

Note that in some embodiments of the invention, the processor may start another timer T1 for handling a duplicated paging when just entering the connected mode. For example, the processor may start the timer T1 when receiving a paging message from the peer device. When another paging message is received from the peer device before the timer T1 expires, the processor may ignore the paging message. In the embodiments of the invention, ignoring the paging message means the processor discards and does not process or respond to the paging message. In some other embodiments of the invention, ignoring the paging message means the processor discards and does not process or respond to the paging message with same cn-Domain field.

Note further that in some embodiments of the invention, the processor may start yet another timer T3 for handling a duplicated paging received when the communications apparatus has entered the connected mode for a while. As discussed above, when a paging message is received from the peer device in the connected mode, the processor may transmit a message to the peer device via the radio transceiver to trigger a re-synchronization procedure. Meanwhile, the processor may start the timer T3. When another paging message is received from the peer device before the timer T3 expires, the processor may ignore the paging message. In some other embodiments of the invention, ignoring the paging message means the processor discards and does not process or respond to the paging message with same cn-Domain field.

Figure 6:
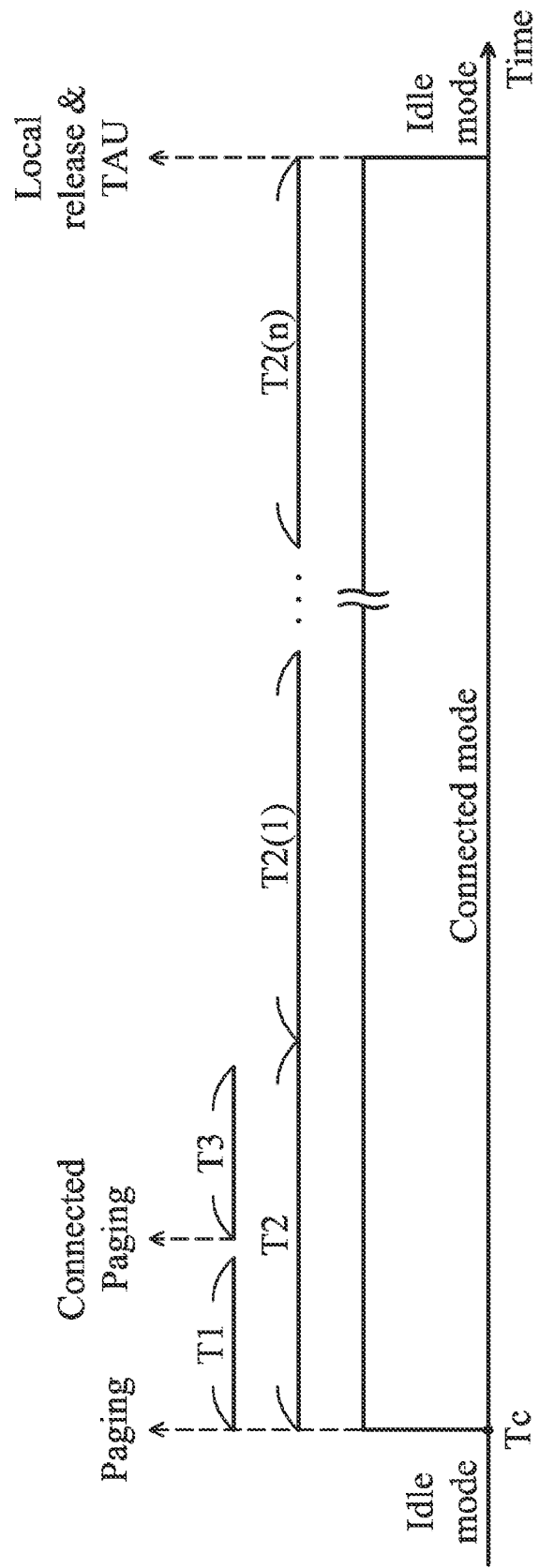
FIG. 6 shows an exemplary timing diagram according to an embodiment of the invention.

FIG. 6 shows an exemplary timing diagram according to an embodiment of the invention. As shown in FIG. 6, the processor receives a paging message from the peer device and enters the connected mode at the time Tc. The processor may start a timer T1 for handling a duplicated paging when just entering the connected mode. When another paging message is received from the peer device before the timer T1 expires, the processor may ignore the paging message.

After entering the connected mode, the processor may also set a timer T2 for detecting whether there is any uplink or downlink data transmission to or from the peer device. When the timer T2 has expired and there is no uplink or downlink data transmission to or from the peer device within this period, the processor transmits a random access request message to the peer device via the radio transceiver to trigger a random access procedure as discussed above. When the random access procedure fails, the processor may determine to perform radio link failure procedure or leave the connected mode and returns to an idle mode. When the random access procedure succeeds, the processor may determine to keep operating in the connected mode and start the timer T2 again as the timer T2(1) shown in FIG. 6. When the random access procedure has been triggered and succeeded at least n times (n is a positive integer), but there is still no uplink or downlink data transmission to or from the peer device, the processor may determine to perform local release to release an RRC connection and transmits a tracking area update request to the peer device via the radio transceiver to trigger a TAU procedure without including an active flag.

In addition, after the timer T1 expires, the processor may further set a timer T3 when receiving a connected mode paging for handling a duplicated paging. As discussed above, when another paging message is received from the peer device before the timer T3 expires, the processor may ignore the paging message. In some other embodiments of the invention, ignoring the paging message means the processor discards and does not process or respond to the paging message with same cn-Domain field.

Figure 7A:
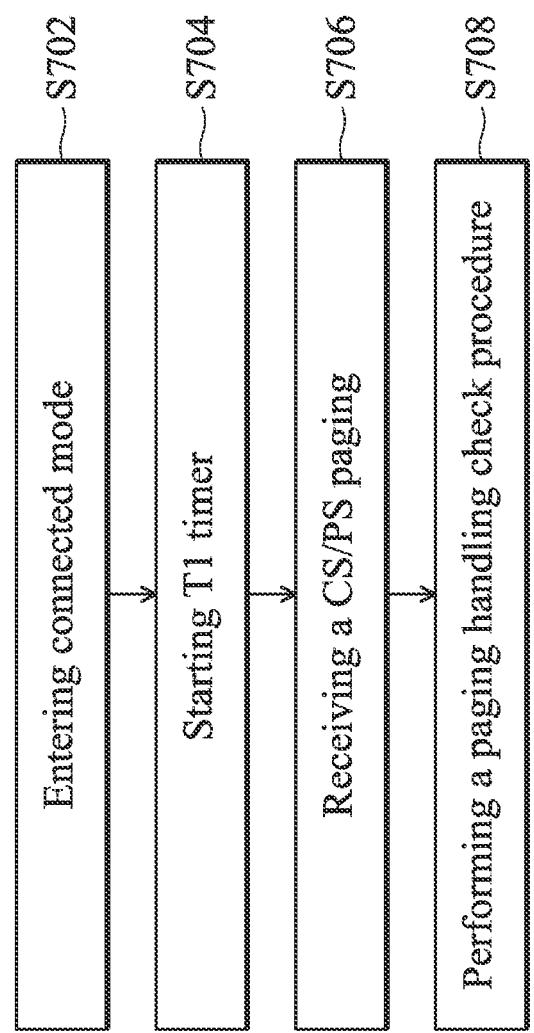
FIG. 7A shows an exemplary flow chart for handling a duplicated paging when just entering the connected mode according to an embodiment of the invention.

FIG. 7A shows an exemplary flow chart for handling a duplicated paging when just entering the connected mode according to an embodiment of the invention. After entering the connected mode (Step S702), the processor may start a timer T1 (Step S704). Upon receiving a CS or PS paging (Step S706), the processor may perform a paging handling check procedure (Step S708) (the paging handling check procedure is shown in FIG. 8).

Figure 7B:
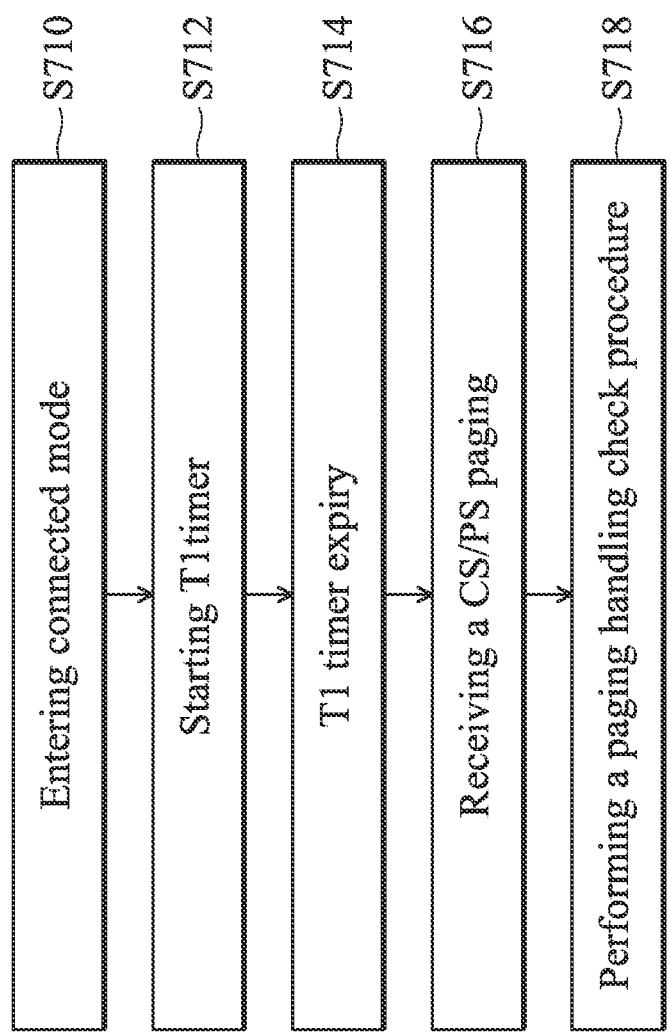
FIG. 7B shows an exemplary flow chart for handling a connected paging after entering the connected mode for a while according to an embodiment of the invention.

FIG. 7B shows an exemplary flow chart for handling a duplicated paging after entering the connected mode for a while according to an embodiment of the invention. After entering the connected mode (Step S710), the processor may start a timer T1 (Step S712). After the timer T1 expires (Step S714) and when receiving a CS or PS paging (Step S716), the processor may perform a paging handling check procedure (Step S718) (the paging handling check procedure is shown in FIG. 8).

Figure 7C:
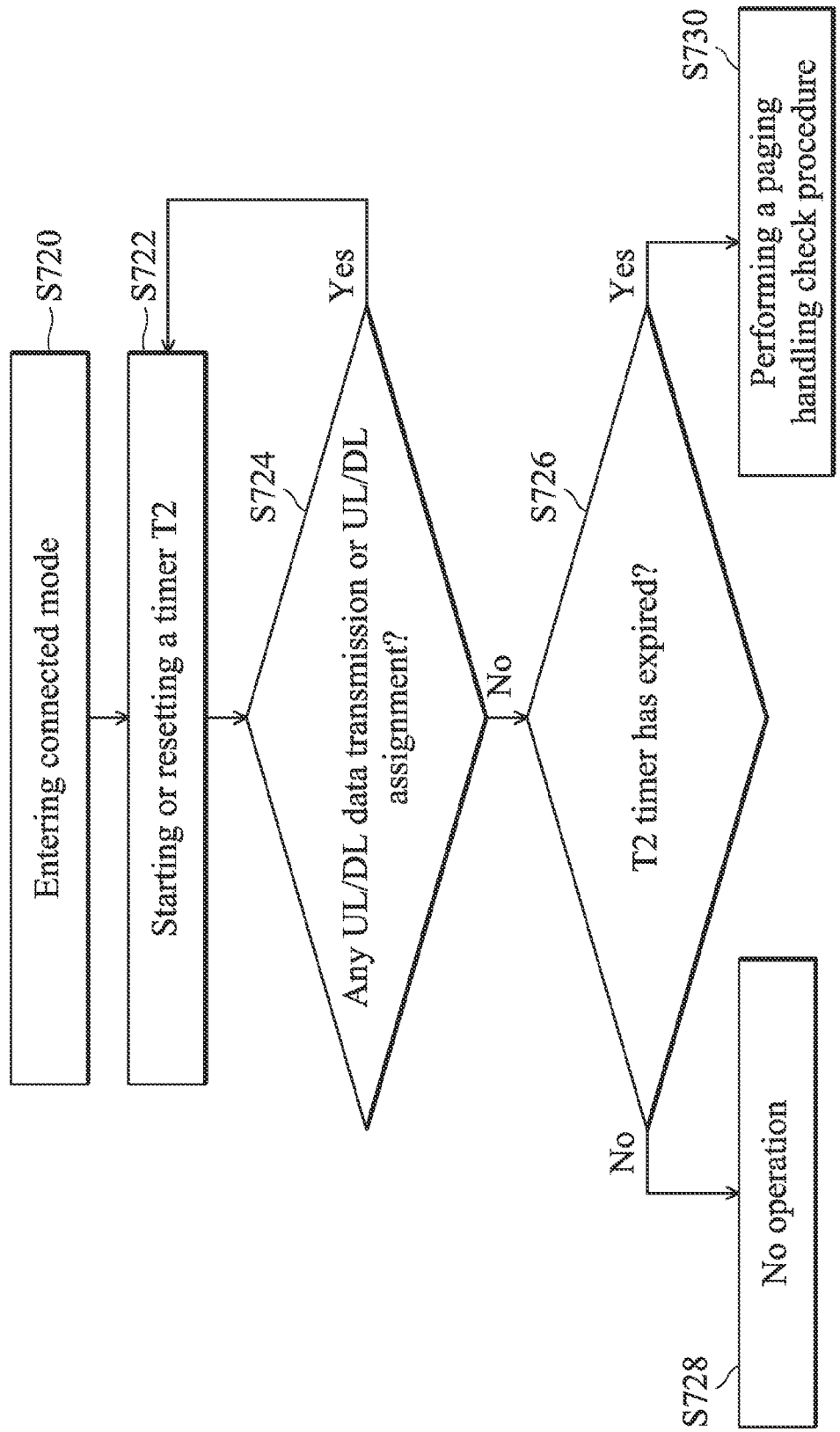
FIG. 7C shows an exemplary flow chart for detecting whether there is any uplink or downlink data transmission to or from the peer device.

FIG. 7C shows an exemplary flow chart for detecting whether there is any uplink or downlink data transmission to or from the peer device. After entering the connected mode (Step S720), the processor may start or reset a timer T2 (Step S722) and keep detecting whether there is any UL/DL data transmission or UL/DL assignment (Step S724). If so, the process returns to step S722 to reset the timer T2. If not, the processor may further check whether T2 timer has expired (Step S726). If so, the processor may perform a paging handling check procedure (Step S730) (the paging handling check procedure is shown in FIG. 8). If not, the processor has no further operations (Step S728).

Figure 8:
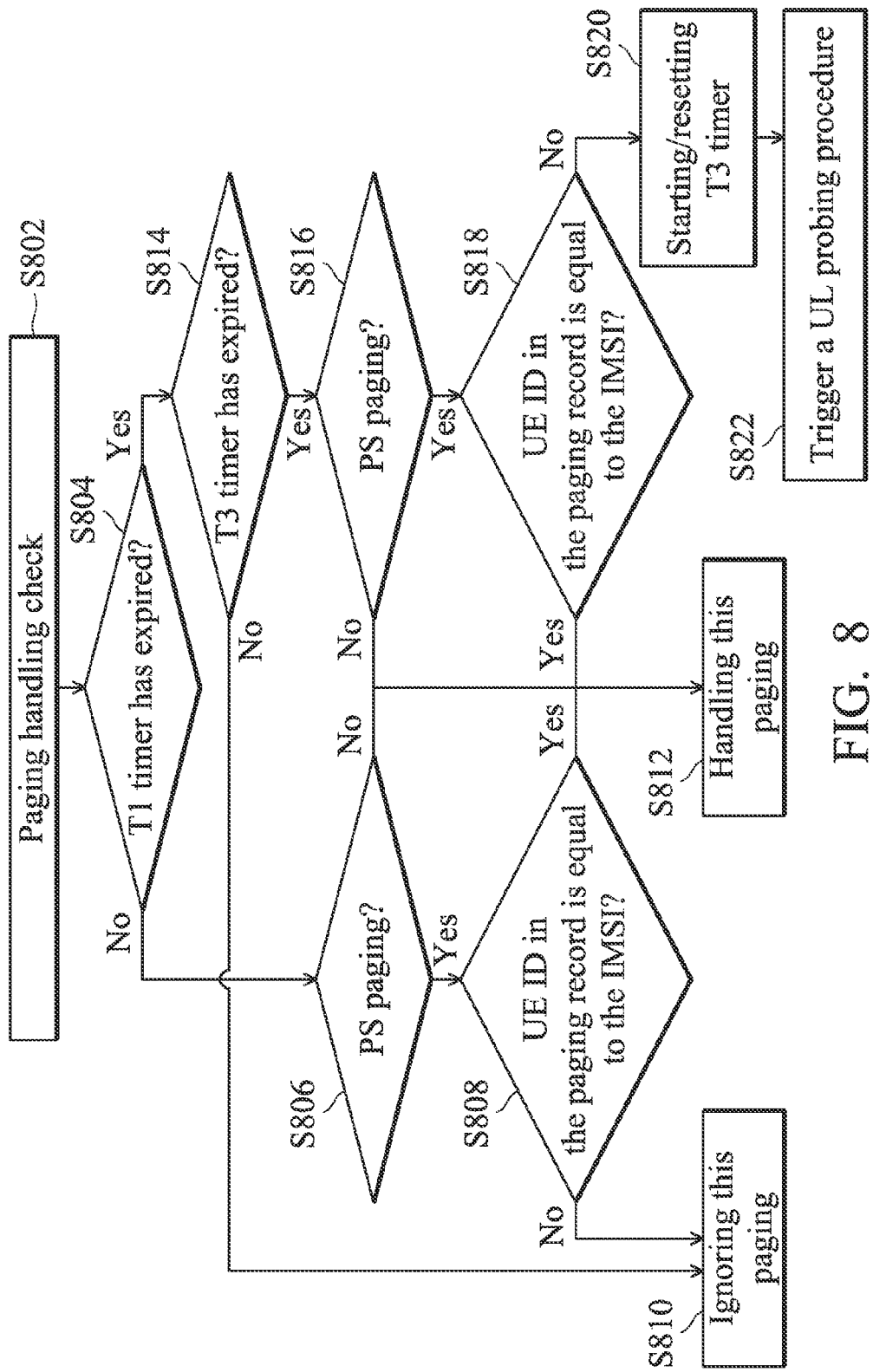
FIG. 8 shows an exemplary flow chart for performing a paging handling check procedure according to an embodiment of the invention.

FIG. 8 shows an exemplary flow chart for performing a paging handling check procedure according to an embodiment of the invention. When performing the paging handling check procedure (Step S802), the processor may first check whether the T1 timer has expired (Step S804). If not, the processor may further check the cn-Domain field in the paging record to determine whether the paging message is a PS paging (Step S806). If so, the processor may further check whether the UE ID field in the paging record is equal to the IMSI of the communications apparatus (Step S808). If not, the processor may ignore this paging (Step S810).

On the other hand, when the paging message is a CS paging or when the paging message is a PS paging and the UE ID field in the paging record is equal to the IMSI of the communications apparatus, the processor may handle this paging (Step S812). For example, for the CS paging, the processor may transmit an extended service request (ESR) message to the peer device. Note that in some embodiments of the invention, instead of transmitting the ESR message, the processor may also just ignore this CS paging, and the invention should not be limited to FIG. 8. For the PS paging with the UE ID equal to the IMSI of the communications apparatus, the processor may perform an attach procedure as described in the 3GPP TS 24.301 standard.

When the T1 timer expires, the processor may further check whether the T3 timer has expired (Step S814). If the timer T3 has been started but has not expired, the processor may ignore this paging (Step S810) since it is a duplicated paging received after entering the connected mode for a while. If the timer T3 has not been started or expired, the processor may further check the cn-Domain field in the paging record to determine whether the paging message is a PS paging (Step S816). If so, the processor may further check whether the UE ID field in the paging record is equal to the IMSI of the communications apparatus (Step S818). If not, the processor may start or reset the T3 timer (Step S820) and trigger a UL probing procedure (Step S822) (the UL probing procedure is shown in FIG. 9).

On the other hand, when the paging message is a CS paging or when the paging message is a PS paging and the UE ID field in the paging record is equal to the IMSI of the communications apparatus, the processor may handle this paging (Step S812) as discussed above. For example, for the CS paging, the processor may transmit an extended service request (ESR) message to the peer device. For the PS paging with the UE ID equal to the IMSI of the communications apparatus, the processor may perform an attach procedure as described in the 3 GPP TS 24.301 standard.

Figure 9:
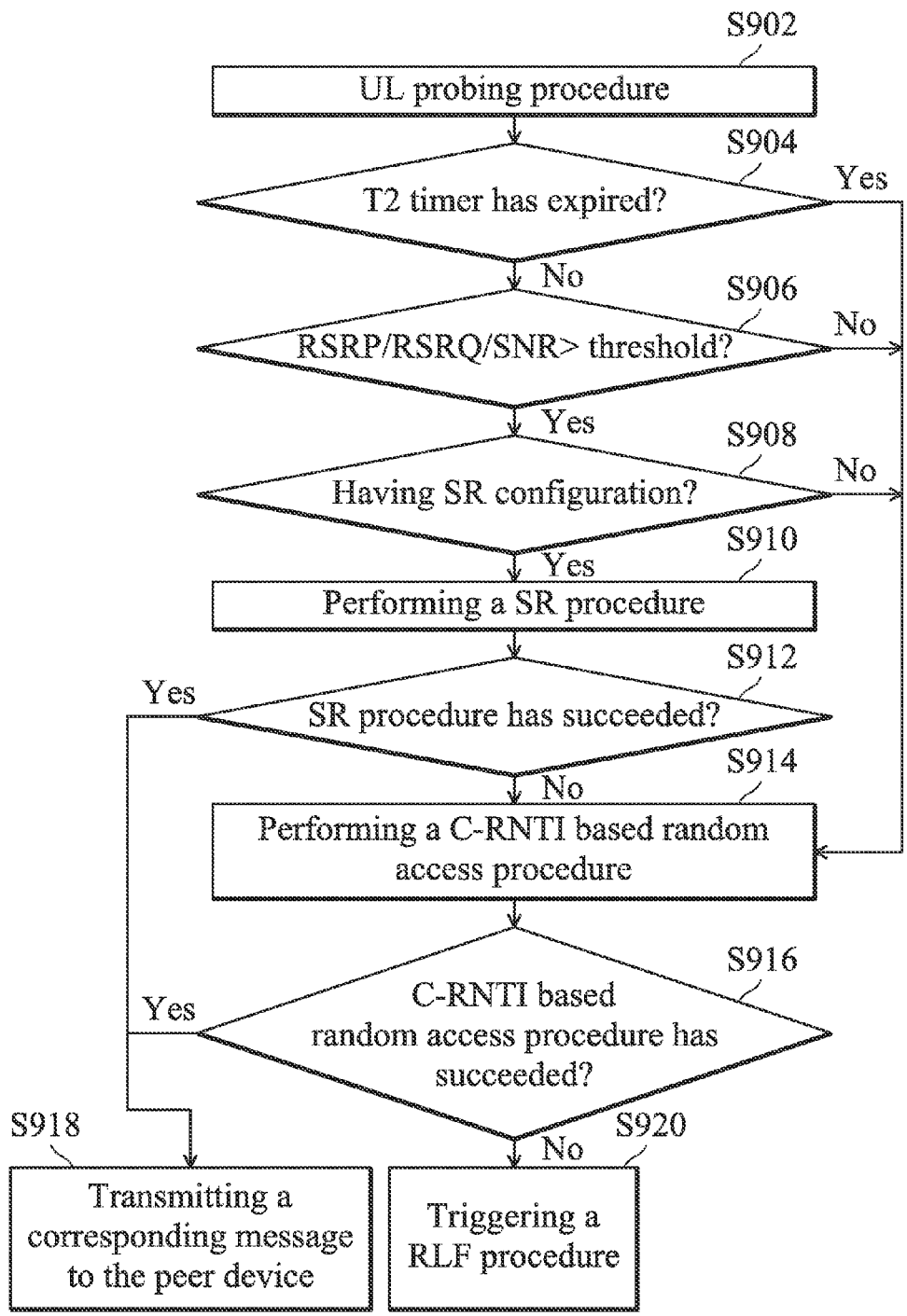
FIG. 9 shows an exemplary flow chart for performing a UL probing procedure according to an embodiment of the invention.

FIG. 9 shows an exemplary flow chart for performing a UL probing procedure according to an embodiment of the invention. When performing the UL probing procedure (Step S902), the processor may first check whether the T2 timer has expired (Step S904). If so, the processor may transmit a random access request message to the peer device to trigger and perform a C-RNTI (Cell-Radio Network Temporary Identifier) based random access procedure (Step S914) (the C-RNTI based random access procedure is shown in FIG. 11). If not, the processor may further check whether the value of a signal quality indicator (such as the RSRP, RSRQ or the SNR) is higher than a predetermined threshold (Step S906). If not, the processor may transmit a random access request message to the peer device to trigger and perform a C-RNTI based random access procedure (Step S914). If so, the processor may further check whether a service request (SR) configuration has been received and not released by the processor (Step S908). When the peer device assigns the SR configuration for the communications apparatus, the SR configuration may be carried in the connection reconfiguration message to the communications apparatus. The communications apparatus may receive the connection reconfiguration message as entering the connected mode. If the configuration has not been received or released by the processor due to the expiry of time alignment timer, the processor may transmit a random access request message to the peer device to trigger and perform a C-RNTI based random access procedure (Step S914). If so, the processor may transmit a scheduling request message to the peer device to trigger and perform a SR procedure (Step S910) (the SR procedure is shown in FIG. 10).

After performing the SR procedure, the processor may further check whether the SR procedure has succeeded (Step S912). If not, the processor may further transmit a random access request message to the peer device to trigger and perform a C-RNTI based random access procedure (Step S914). After performing the C-RNTI based random access procedure, the processor may further check whether the C-RNTI based random access procedure has succeeded (Step S916).

If the SR procedure succeeds or the C-RNTI based random access procedure succeeds, the processor may further transmit a corresponding message to the peer device (Step S918). For example, transmitting a buffer status report for the SR procedure or a MAC control message for the C-RNTI based random access procedure. If the C-RNTI based random access procedure fails, the processor may further trigger a radio link failure (RLF) procedure (Step S920) (the RLF procedure is shown in FIG. 12).

Figure 10:
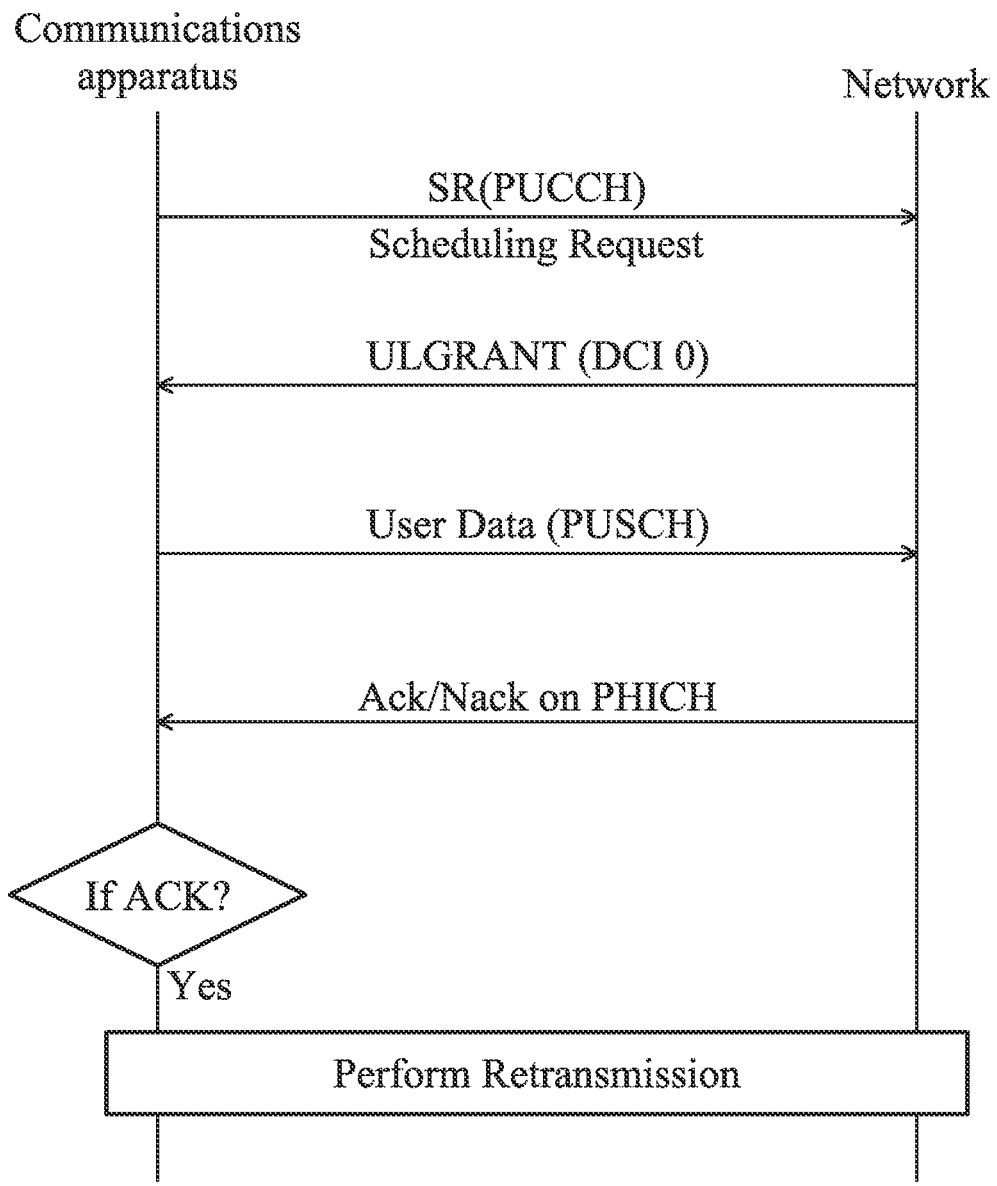
FIG. 10 shows an exemplary flow chart for performing a scheduling request procedure according to an embodiment of the invention.
Figure 11:
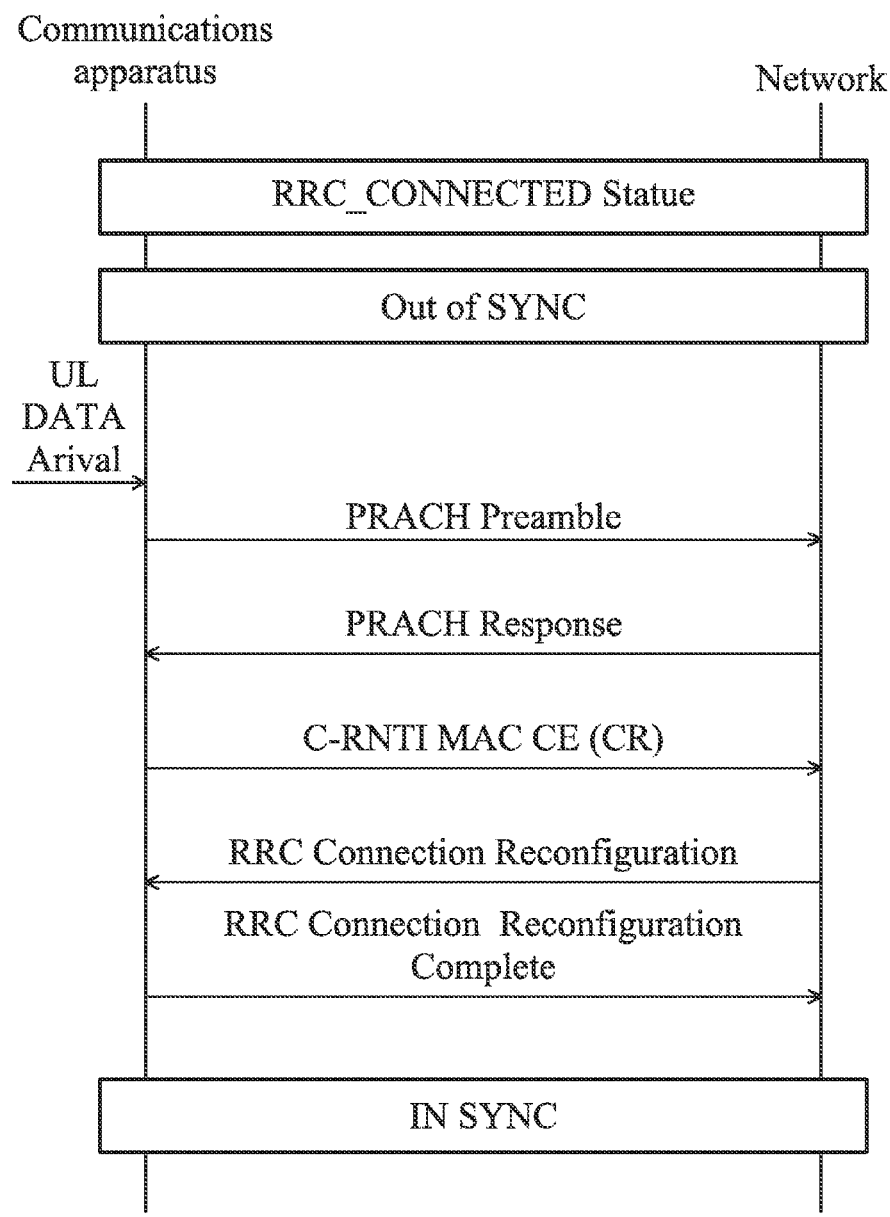
FIG. 11 shows an exemplary flow chart for performing a C-RNTI based random access procedure according to an embodiment of the invention.

FIG. 10 shows an exemplary flow chart for performing a scheduling request procedure according to an embodiment of the invention. When performing a scheduling request procedure, the processor may transmit a scheduling request (SR) message on PUCCH to the peer device in the network. Upon receiving the SR message, the peer device may transmit a UL grant message to the communications apparatus. Then, the processor may transmit uplink user data to the peer device. The peer device may transmit an ACK or NACK message on the PHICK to indicate whether the user data has successfully been received. When receiving a NACK message, the processor may further perform retransmission. Note that if the processor and the peer device in the network are out-of-sync, the peer device may not response to the received SR message and the SR procedure will fail and the processor may further trigger a C-RNTI based random access procedure.

FIG. 11 shows an exemplary flow chart for performing a C-RNTI based random access procedure according to an embodiment of the invention. When performing a C-RNTI based random access procedure, the processor may transmit a random access message with preamble on PRACH. Upon receiving the random access request message, the peer device may respond a PRACH response to the communications apparatus. The processor may transmit the C-RNTI MAC control element to the peer device. The peer device may then further transmit the RRC connection reconfiguration message to the communications apparatus, and the processor may respond by sending an RRC connection reconfiguration complete message to the peer device. Note that if the processor and the peer device in the network are out-of-sync, the peer device may not response to the received C-RNTI MAC control element and the C-RNTI based random procedure will fail and the processor may further trigger a radio link failure procedure.

Figure 12:
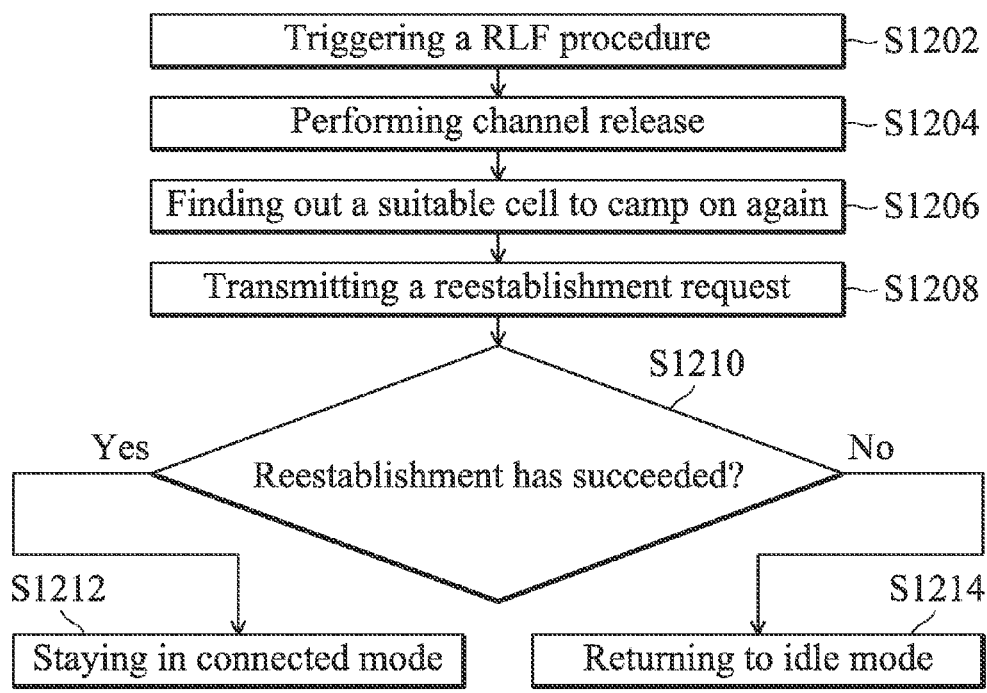
FIG. 12 shows an exemplary flow chart for triggering a RLF procedure according to an embodiment of the invention.

FIG. 12 shows an exemplary flow chart for triggering a RLF procedure according to an embodiment of the invention. When triggering a RLF procedure (Step S1202), the processor may first perform channel release to release an RRC connection at the communications apparatus side (Step S1204). Next, the processor may perform cell search to find out a suitable cell to camp on again (Step S1206). Next, the processor may transmit a reestablishment request to trigger a reestablishment procedure (Step S1208). Next, the processor may determine whether the reestablishment has succeeded (Step S1210). If the processor receives a reestablishment response from the network and transmit a reestablishment complete message to the network, the processor may determine that the reestablishment has succeeded and may determine to keep operating in the connected mode (Step S1212). If the processor does not receive any response from the network or receives a reestablishment reject message from the network, the processor may determine that the reestablishment has failed, and may determine to leave the connected mode and return to the idle mode (Step S1212).

As discussed above, the 3GPP standards only specify how to handle a paging in the idle mode, and fail to specify how to handle a paging in the connected mode. If the communications apparatus just discards the paging received in the connected mode, the peer device may consider the communications apparatus is out of service and may not send any CS or PS paging to the communications apparatus, causing the communications apparatus to become unable to receive any CS or PS paging. In addition, staying in the connected state without any uplink or downlink data transmission is also very power-consuming for a communications apparatus.

However, by applying the proposed methods as discussed above, the communications apparatus can perform an adequate procedure to re-synchronize the communication mode with the peer device. In this manner, the abnormal paging message received in the connected mode can be adequately processed such that the peer device will not consider the communications apparatus to be out of service and will not take any further action which will cause the communications apparatus to suffer harmful side effects. In addition, when the communications apparatus stays in the connected mode but there is no uplink or downlink data transmission to or from the peer device for a long period of time, the communications apparatus may determine to perform a local release and/or a tracking area update (TAU) procedure. In this manner, the battery power can be saved.

The embodiments of the present invention can be implemented in any of numerous ways. For example, the embodiments may be implemented using hardware, software or a combination thereof. It should be appreciated that any component or collection of components that perform the functions described above can be generically considered as one or more processors that control the function discussed above. The one or more processors can be implemented in numerous ways, such as with dedicated hardware, or with general-purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising: a radio transceiver, transmitting or receiving wireless radio frequency signals to or from a peer device; and a processor, determining whether re-synchronization in a communication mode with the peer device is required according to a determination rule, and when the re-synchronization is required, transmitting a message to the peer device via the radio transceiver to trigger a re-synchronization procedure, wherein the processor determines whether the re-synchronization is required in a connected mode, wherein the connected mode is entered after the processor has set up a radio resource control (RRC) connection with the peer device and transmitted a connection setup complete message to the peer device in response to reception of a first paging message, and wherein the processor further starts a first timer when the connected mode is entered, and when a second paging message, which comes after the first paging message and with same Cn-Domain field as the first paging message, is received from the peer device before the first timer expires, the processor ignores the second paging message and does not process or respond to the second paging message, wherein the processor further starts a second timer when transmitting the message to the peer device to trigger the re-synchronization procedure, and when another paging message is received from the peer device before the second timer expires, the processor ignores the paging message.

2. The communications apparatus as claimed in claim 1, wherein the determination rule is whether a paging message is received from the peer device in the connected mode.

3. The communications apparatus as claimed in claim 1, wherein the determination rule is whether there is no uplink or downlink data transmission to or from the peer device for a predetermined period in the connected mode.

4. The communications apparatus as claimed in claim 2, wherein when the paging message received from the peer device in the connected mode is a circuit-switched (CS) paging, the processor transmits an extended service request to the peer device via the radio transceiver.

5. The communications apparatus as claimed in claim 2, wherein when the paging message received from the peer device in the connected mode is a packet-switched (PS) paging, the processor transmits a scheduling request message or a random access request message to trigger a C-RNTI based random access procedure to the peer device via the radio transceiver.

6. The communications apparatus as claimed in claim 3, wherein the processor transmits a random access request message to the peer device via the radio transceiver to trigger a C-RNTI based random access procedure.

7. The communications apparatus as claimed in claim 6, wherein the processor further leaves the connected mode and returns to an idle mode when the random access procedure fails.

8. The communications apparatus as claimed in claim 6, wherein the processor further performs local release to release the RRC connection and transmits a tracking area update (TAU) request message to the peer device via the radio transceiver to trigger a TAU procedure when the random access procedure has been triggered a predetermined number of times.

9. A method for a communications apparatus to re-synchronize a communication mode with a peer device communicating with the communications apparatus, comprising:
   starting a first timer when receiving a first paging message from the peer device for the communications apparatus to enter a connected mode, wherein the connected mode is entered after the communications apparatus has set up a radio resource control (RRC) connection with the peer device and transmitted a connection setup complete message to the peer device in response to reception of the first paging message; when receiving a second paging message, which comes after the first paging message and with same Cn-Domain field as the first paging message, from the peer device before the first timer expires, ignoring the second paging message by not processing or responding to the second paging message;
   determining whether re-synchronization in a communication mode with the peer device is required according to a determination rule; when the re-synchronization is required, transmitting a message to the peer device to trigger a re-synchronization procedure, wherein the determination is made in the connected mode;
   starting a second timer when transmitting the message to the peer device to trigger the re-synchronization procedure; and when receiving another paging message from the peer device before the second timer expires, ignoring the paging message.

10. The method as claimed in claim 9, wherein the determination rule is whether a paging message is received from the peer device in the connected mode.

11. The method as claimed in claim 9, wherein the determination rule is whether there is no uplink or downlink data transmission to or from the peer device for a predetermined period in the connected mode.

12. The method as claimed in claim 10, wherein when the paging message received from the peer device in the connected mode is a circuit-switched (CS) paging, the message transmitted to the peer device is an extended service request.

13. The method as claimed in claim 10, wherein when the paging message received from the peer device in the connected mode is a packet-switched (PS) paging, the message transmitted to the peer device is a scheduling request message or a random access request message to trigger a C-RNTI based random access procedure.

14. The method as claimed in claim 11, wherein the message transmitted to the peer device a random access request message to trigger a C-RNTI based random access procedure.

15. The method as claimed in claim 14, further comprising: leaving the connected mode and returning to an idle mode when the random access procedure fails.

16. The method as claimed in claim 14, further comprising: performing local release to release the RRC connection and transmitting a tracking area update (TAU) request message to the peer device to trigger a TAU procedure when the random access procedure has been triggered a predetermined number of times.

* * * * *